United States Patent Office 3,119,133
Patented Jan. 28, 1964

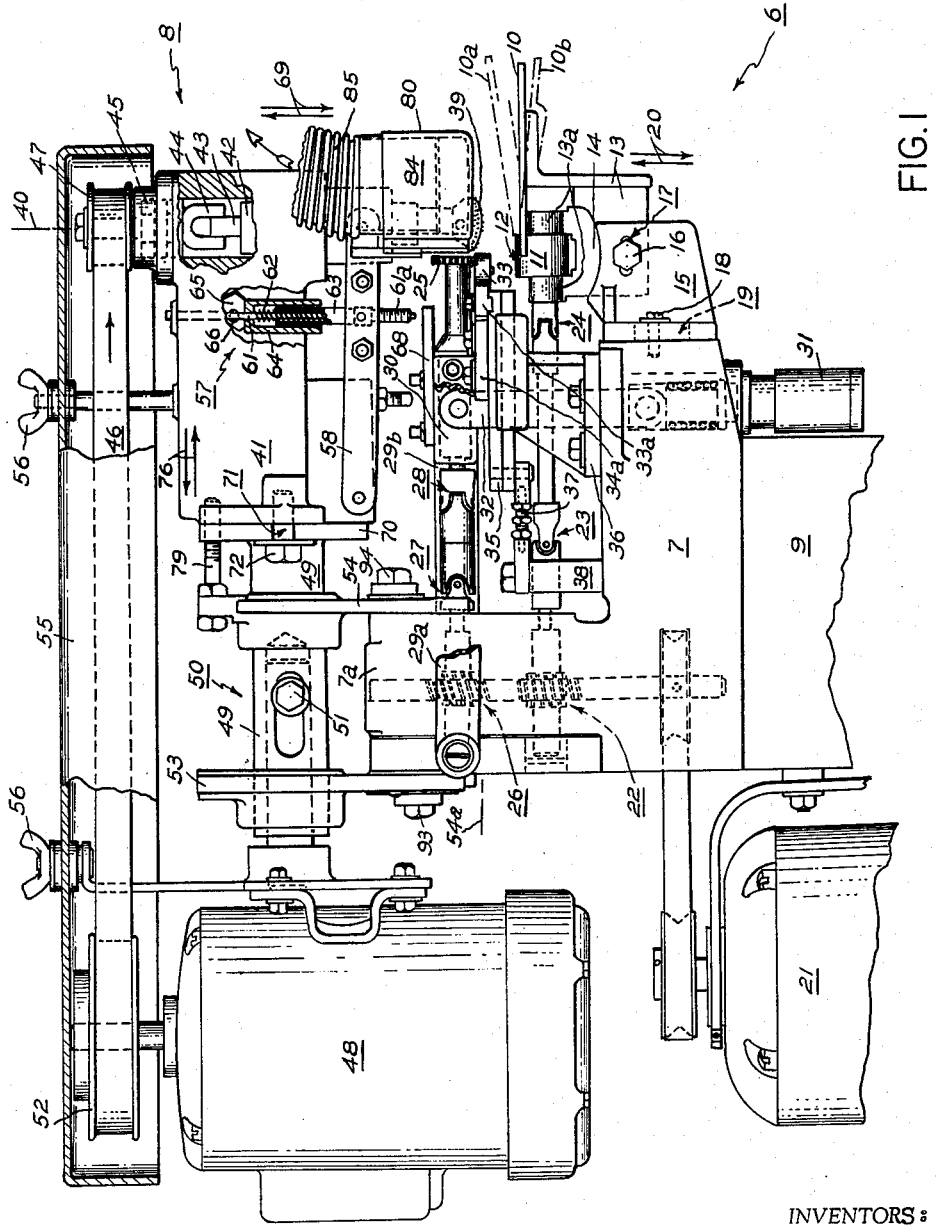

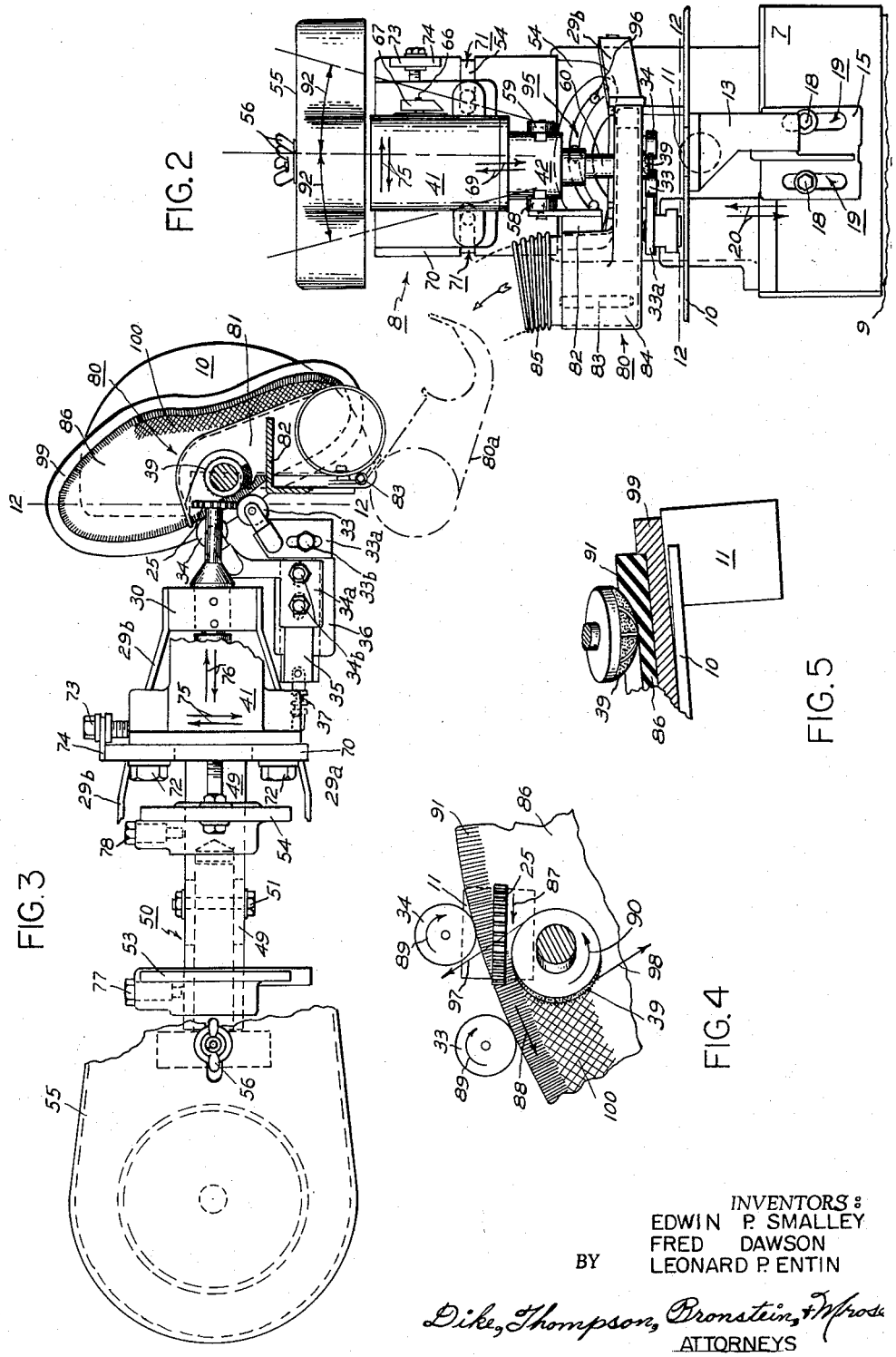

3,119,133
SOLE ROUGHING MACHINERY
Edwin P. Smalley, Lynnfield, Fred Dawson, West Roxbury, and Leonard P. Entin, Wayland, Mass., assignors to Compo Shoe Machinery Corporation, Waltham, Mass., a corporation of Delaware
Filed Apr. 27, 1962, Ser. No. 190,549
18 Claims. (Cl. 12—17)

The present invention relates to improvements in apparatus for preparing sole surfaces for binding to footwear upper assemblies and, more particularly, to novel and improved machinery having versatile adjustments for roughening certain upper surfaces of molded outsoles to produce accurately-defined roughened cementing areas on outsoles of a variety of configurations.

As has long been known in the art of manufacturing shoes and like articles of footwear wherein an outsole member is cemented to overlasted margins of a shoe upper, those normally-smooth upper surfaces of the outsole with which a strong adhesive bond is to be made must first be roughened to insure that fresh, uncontaminated and minutely-irregular surface conditions exist. Molded rubber or vinyl plastic outsoles, for example, are so smoothly surfaced at the intended near-marginal sites of bonding that roughening is an absolute prerequisite to high-quality cementing. A variety of techniques may be practiced in roughing, including chemical and thermal treatments and mechanical abrading. The latter technique has commonly been exploited through use of a high-speed grinding tool which is rotated in a fixed position while the outsole workpiece is propelled and guided such that the grinding tool will tend to abrade its upper surface along a predetermined path near but inwardly of its edges. Machines of this general type have involved a pair of propelling feed rolls, engaging the upper and lower surfaces of the outsole workpiece, and a pair of edge guides or rolls which engage the outsole edges in a manner promoting a desired steering of the workpiece in relation to the roughing tool. In these respects, such roughing machines are akin to known machinery which has been used for the application of adhesive coatings at about the same near-marginal areas atop outsole members.

The roughening operations as performed by a high-speed grinding tool tend to develop a substantial amount of vibration, are prone to interfere with optimum propulsion of the workpieces, can create hazardous and unwholesome discharges of roughing dust, and may fail to produce continuous and uniform roughing of surfaces which are of non-standard contours reflecting size and style differences or origins with different manufacturers. When the machinery must be adjustable to accommodate either relatively thin workpieces, such as perfectly flat outsoles, or relatively thicker workpieces, such as outsoles having integral heels and a processing matrix of a compensating thickness, then the aforesaid difficulties are even more pronounced. In accordance with the present teachings, however, roughing machinery which avoids these difficulties, and which is yet of low-cost manufacture, may be readily constructed and may be operated effectively on a variety of materials by relatively unskilled personnel. To these ends, the improved roughing machinery is provided with a drive and mounting assembly for the roughing tool which is independently adjustable and may be readily articulated to develop selected grinding pressures, optimum angles and contours of grinding, and preferred edge or margin clearances, without disturbing the drive for the roughing tool. Further, the workpiece-supporting table and lower feed roll drive are independently articulated, as a unit, to introduce important grinding corrections for outsoles of non-standard surface contours and for cutters of various shapes and degrees of wear. Grinding debris is withdrawn from about the cutter, as it is formed, through a special form of close-fitting shroud and guard which is pivotally mounted to facilitate cutting tool replacements.

Accordingly, it is one of the objects of the present invention to provide novel and improved apparatus for preparing surfaces of footwear outsoles for bonding to shoe uppers, in which outsoles of varying surface contours and materials are accurately and uniformly treated along predetermined paths.

Another object is to provide outsole roughing machinery of low-cost manufacture wherein troublesome vibration and dust discharges are suppressed.

A yet further object is to provide novel outsole roughing machines having a laterally-tiltable roughing tool mounting and powdered drive assembly, including independently variable tool pressure provisions, and a separately-tiltable feed roll and table unit, by which edge control, workpiece propulsion, and roughing characteristics are regulated simply and with high precision.

By way of a summary account of practice of this invention in one of its aspects, the construction of an outsole roughing machine includes a pedestal unit of lightweight steel sheet and framework fabrication carrying an elevated base and roughing head assembly at a convenient height for access by an operator. The base provides support for a small work table at the front of the machine, as well as for a pair of edge guides in a preferred form of rollers, and houses mechanisms for driving upper and lower feed rolls synchronously through universal joints which permit the upper feed roll to be raised and lowered as needed and the lower feed roll to be inclined at selected angles away from a horizontal position. For the latter purpose, the lower feed roll is fixedly journalled in the work table bracket, and must be inclined or tilted with it. The roughing head assembly, which includes a separate electric motor coupled in driving relationship to a spring-biased tool-supporting spindle, is pivotally mounted upon the base for selected angular orientations about a fore-and-aft axis such that the roughing tool may be set at laterally-tilted positions within a range of about ±15 degrees from a center near the site at which the tool engages the workpiece. An exhaust shroud, normally surrounding the roughing tool in a close-fitting relationship, is coupled with a portable dust collector of a conventional type by way of a flexible hose, and is pivoted upon the roughing head assembly such that it may readily be swung aside to expose the tool for replacements or adjustments.

Although the features of this invention which are considered to be novel are set forth in the appended claims, further details as to preferred practices of the invention, as well as the further objects and advantages thereof, may be most readily comprehended through reference to the following description taken in connection with the accompanying drawings, wherein:

FIGURE 1 is a partly cross-sectioned side view of the upper portions of an outsole roughing machine in which teachings of the present invention are practiced;

FIGURE 2 depicts the same portions of the same roughing machine in a front view;

FIGURE 3 is a view taken from the top of the same roughing machine, with some parts broken away illustrating certain portions of the rougher head assembly in association with an outsole undergoing processing;

FIGURE 4 presents a diagram of grinding, propelling and guiding elements, together with force and motion notations, for the improved roughing machinery; and FIGURE 5 provides a detail, partly in cross-section, of a roughing tool operating upon an outsole supported upon an inclined table and feed roll unit to roughen surfaces having a high degree of curvature.

In the embodying apparatus 6 portrayed in FIGURE 1, the operating base 7 and surmounting rougher head assembly 8 are shown supported by a portion of a pedestal unit 9 which elevates them from floor level to heights (adjustable by mechanisms not illustrated) which are convenient for different operators. The various mechanisms which are involved in the roughing process, described later herein, are of such mechanical nicety and lend themselves to setting in such precise relative operating orientations that severe vibrational and jamming forces are minimized and, consequently, the pedestal unit may conveniently be fabricated from lightweight steel plate and framework members rather than comprise a massive cast structure. At its front end, base 7 carries a small work-support table 10 upon which an outsole, or an outsole and matrix combination, is rested during processing. Table 10 may be maintained substantially horizontal in some roughing operations, although in other instances, as when outsole surface contours involves pronounced curvatures within areas to be roughened, the processing may not be continuous and uniform. It has been discovered that such difficulties may be over come with the aid of an inclination or tilt imparted to the outsole by the table and its associated lower feed roll 11 about a transverse axis 12—12 (FIGURES 1 and 3). The table and lower feed roll are therefore supported on a bracket 13, including a general circular segment 14 which is nested in a correspondingly-shaped portion of a bracket 15 affixed to the front of base 7. Release of lock bolt 16 permits the desired tilting or swivelling of the table and feed roll unit on bracket 15 about transverse axis 12—12 by at least a few degrees above and below the horizontal level, as denoted by the dashed line-work 10a and 10b. Elongated slot 17 in bracket 15 accommodates the needed motion of loosened lock bolt 16, and this bolt is obviously tightened when the desired inclination is set. In addition, the table and feed roll unit may be set at various heights, principally to compensate for the different thicknesses of outsoles and outsole-matrix combination which are being processed; such settings are enabled by the lock bolts 18 which cooperate with the elongated slots 19. Arrows 20 characterize the sense of the latter movements. Table bracket 13 also includes a pair of spaced journals 13a for the rotatable lower feed roll 11, preserving the axis of this cylindrical roll in a vertical fore-and-aft plane while at the same time forcing it to assume the same inclinations as the work table 10. The roll 11 is rotated at a desired speed by the pedestal-mounted electric motor 21, through a worm-gear unit 22 and through a flexible transmission including two universal joints or couplings 23 and 24 which accommodate the needed variable tilting of the work table and lower feed roll.

Optimum seizure and propulsion of outsole workpieces requires the use of an upper feed roll, 25, which is preferably driven at the same rate as the lower feed roll but in an opposite angular direction (clockwise, viewed from the front of the machine). For these purposes, the upper feed roll is also coupled with electric motor 21, through a worm-gear unit 26 and through a flexible transmission including universal couplings 27 and 28. The latter type of transmission is required to permit the upper feed roll to be raised, thereby readily admitting an outsole or outsole-matrix combination into the proper location within the machine, and then to be lowered onto and in clamping engagement with the exposed upper surface of the outside. Yoke arms 29a and 29b pivot the bearing block 39 for the upper feed roll on the rear housing 7a, to preserve the axis of rotation in a fixed vertical fore-and-aft plane throughout elevating and lowering excursion. It is important that the upper feed roll make firm driving engagement with the outsole and that it serve a clamping function which inhibits tendencies for the outsole and matrix to vibrate upon the table and lower feed roll; accordingly the yoke and upper feed roll are coupled with a pneumatic motor (piston-cylinder unit) 31 via a link 32, and depression of a foot switch (not shown) energizes a solenoid valve which pressurizes the motor 31 to drive the upper feed roll down upon an outsole. Release of the foot switch reverse the pressurization, in a known manner, to raise the upper feed wheel from the workpiece.

Base 7 also supports a pair of edge guides, 33 and 34, in the preferred form of small cylindrical rollers, these being spaced apart in substantially the same fixed horizontal plane for engagement with the edges of outsides being roughened by the machine. As is evident from the illustrations in FIGURES 2, 3 and 4, these edge guides are displaced from one another, although by but a short distance which permits both to follow the usual edge contours of an outsole. Each of rollers 33 and 34 is separately mounted upon a different bracket, 33a and 34a, respectively, for movements which permit them to be set in various front-to-rear and side-to-side relationships as needed to accommodate outsoles of different sizes and edge contouring in an optimum manner. For these purposes, bracket 33a is positionable laterally on the slide 35, as fixed by a lock bolt 33b cooperating with an elongated laterally-extending slot (FIGURE 3). And, bracket 34a is positionable rearwardly of bracket 33a to various extents, as determined by the settings of lock bolts 34b on slide 35 cooperating with fore-and-aft elongated slots. Once set in these relative respects, both edge rollers may be adjusted together, in the fore-and-aft direction, by positioning of their common mounting slide 35 in the same direction. Slide 35, held by a bracket 36, is set firmly, simply and accurately by appropriate turning of the adjusting screw 37 which is threadedly coupled between the slide and a post 38 fixed to the base.

Adjustments of screws 37 are effective to shift the edge rollers fore-and-aft in relation to the roughing tool 39, and, thereby, to regulate the important width of outsole margin left unscoured by the roughing tool. Preferably, the bottom of roughing tool 39 possesses the illustrated generally circular curvature, and is studded with industrial diamond grit or chips to develop needed abrasive effects upon the outsole material (such as rubber of vinyl plastic). While the bottom surface may be substantially spherical, with a number of spaced shallow grooves radiating from its bottommost position (FIGURE 5), other forms may be exploited as well, such as that of a flat blade having a contoured bottom, or a known brush or picker-type rougher. In addition to its support for high-speed rotation, the roughing tool is provided with a spring-biased suspension of selectable forces in its axial directions, separately adjustable provisions for settings in both the lateral and fore-and-aft relative to the base, and separately-adjustable provisions for angular settings about a fore-and-aft axis. These articulations of the tool are important to ultimate proper roughing and propulsion of workpieces of various shapes, sizes and materials. The roughing head 8, which mounts tool 39 for rotation about a forward axis 40 lying in a vertical plane, includes a small casting 41 in which is disposed a longitudinally slidable unit 42 to which the roughing tool is affixed at its lower end and which contains a known form of preloaded bearing assembly (details not shown) facilitating the tool shaft rotation. A tongue 43 at the top end of the tool shaft is mated with and rotated by a forked end 44 of an upper drive shaft supported in a separate bearing assembly 45 and driven by a motorized belt 46 and pulley 47. Electric motor 48, the principal function of which is to rotate the roughing tool, is mounted at the rear of the head assembly where it is affixed to the main support beam 49 by way of a slidable connection 50 which may be locked by lock bolt 51 to permit the motor and its pulley 52 to be positioned for optimum tensioning of belt 46. A pair of spaced brackets 53 and 54, mount the beam 49 above the base portion 7a for a desired limited pivotal motion about a lower fore-and-aft axis 54a which passes near the locus of the roughing tool 39. At its forward end, beam 49 supports the main casting 41. The somewhat counterbalanced arrangement of rear motor 48 and front casting 41 on beam 49 facilitates the use of lightweight fabrication techniques and minimizes the resultant effects of vibration. Roughing tool 39 can be rotated smoothly and evenly and its desired longitudinal sliding motions can be made freely, inasmuch as motor belt tensions are fully isolated by the tongue-and-fork coupling elements 43 and 44. A contoured cover 55, removably secured in place by wing nuts 56, protectively guards the moving pulleys and belt.

Slidable unit 42, which carries the rotated roughing tool 39, is normally depressed downwardly by a spring biasing arrangement 57 associated with the pivoted fork arms 58 and 59 which are supported near the rear of casting 41 and which are coupled with the exposed lower portion of slidable unit 42 at their forward ends. These fork arms move up and down with the unit 42, preventing rotation of its exterior sleeve while the bearing-supported tool-driving shaft 60 within it is rotated at high speed by motor 48. Intermediate their ends, the fork arms 58 and 59 are pivotally connected with a vertical shaft 61 which is slidable in casting 41 and which is thrust downwardly by a surrounding coil spring 62 axially compressed between an inner shaft sleeve 63 and an outer sleeve 64. Sleeve 64 is restrained by a polygonally-shaped eccentric cam 65 which engages a cooperating surface on sleeve 64 and which is angularly adjustable on a casing-supported shaft 66, by a side knob 67 (FIGURE 2). Manual turning of knob 67 by the operator causes different surfaces of cam 65 to depress the outer sleeve 64 to different extents, thereby regulating the downward spring thrust or bias on the fork arms and, through them, on the roughing tool 39. In operation, the roughing tool 39 is thus resiliently biased against the outsole surfaces which it scours, the tool pressures being adjustable to any desired extent, depending upon the cam shaping. The uniform-pressure floating action of the tool insures that it will follow the outsole surface contours accurately, without tending either to skip surfaces or to grind too deeply. Because the roughing tool is normally depressed toward the lowermost permissible position, it is necessary that it be elevated when an outsole or outsole-matrix combination is to be inserted into and withdrawn from the machine or if the processing is to be interrupted for some other reason. This elevation is advantageously powered by the pneumatic motor 31 which actuates the upper feed roll assembly, and for this purpose a stop plate 68 is mounted atop the upper feed roll fork arms 29a and 29b in position to engage the lower stop extension 61a of the biasing assembly shaft 61. Both the feed roll and roughing tool should be released at about the same times, and the separable cooperating stopping members 68 and 61a insure that this will occur, while their respective different downward pressures on the outsole workpieces are nevertheless entirely unaffected by the separable one-way connection. Arrows 69 characterize the directions of permissible longitudinal movements of the roughing tool and its associated slide unit 42.

The lateral relationship of the roughing tool 39 and the upper feed roll 25 is important both for the purpose of insuring a proper net thrust urging the workpiece toward the edge guides 33 and 34 and for the purpose of preventing the upper feed roll 25 from marring unroughed portions of the workpiece. Accordingly, the entire main casting is mounted for lateral adjustments on its back mounting plate 70. The latter plate is secured to the support beam 49, and is provided with elongated horizontal slots 71 so that it may slide laterally on the clamping bolts 72 when these are loosened. Side adjusting bolt 73, held axially in a bracket 74 fixed with mounting plate 70, may be turned to slide the casting 41 left or right to the desired positions at which the tool 39 is properly oriented. Arrows 75 (FIGURES 2 and 3) characterize the directions of permissible lateral movement of the main casting and roughing tool. Generally, the preferred position for the roughing tool is slightly to the left of the laterally fixed upper feed roll 25, which is the condition illustrated in FIGURES 2 and 3.

Positioning of the roughing tool in the fore-and-aft directions of arrows 76 is readily accomplished by loosening the lock bolts 77 and 78 associated with beam support brackets 53 and 54 (FIGURE 3), and by sliding the cylindrical support beam in the fore or aft direction in these brackets with the aid of the adjusting bolt 79 connecting the forward bracket 54 with the mounting plate 70 for the main casting 41. An important aspect of this fore-and-aft setting is found in the fact that it does not involve shortening or lengthening of the spacing between the rear rougher motor 48 and the front rougher head, such that pre-set tensioning of belt 46 is not disturbed.

In operation, the roughing tool quickly develops a substantial amount of fine dust or debris from the abrasion of outsoles, this dust being thrown out when it may have effects unwholesome to the operator and is likely to cause fouling and damage to sensitive mechanisms of the machinery. These difficulties are avoided simply and at relatively low cost through use of a special small exhaust shroud 80. This is conveniently fabricated of plastic or sheet metal and is contoured to fit closely about the roughing tool where the debris may be entrained directly in a stream of air drawn into the shroud from the top and rear of the roughing site. The closed exhaust shroud conduit 81 is opened to the rear and at the bottom in the vicinity of the roughing tool to permit air to be drawn into it, as well as to permit its being pivoted from a side position, designated by dashed linework 80a in FIGURE 3, into an operative close-fitting and nearly surrounding relationship to the roughing tool. The conduit portion 81 nowhere extends rearwardly to positions in which it might interfere with the edge rollers 33 and 34, and its intake openings are also relieved sufficiently to provide clearance for the upper feed roll 25 (as seen in FIGURE 3), these proportionings being important inasmuch as relative heightwise movements of these parts is permitted, as has been explained hereinbefore. In this connection, it is noted that the exhaust shroud 80 is itself not stationary but, instead, is fixed with the fork arm 58 by a bracket 82 and therefore moves with the roughing tool such that it is always at the proper level for efficient removal of debris from an outsole. Bracket 82 also carries a hinge connection 83 for the exhaust shroud, which permits the shroud to be displaced to one side (linework 80a) easily and quickly when the roughing tool is to be replaced. A powerful suction is created at the roughing site by withdrawing air from the shroud hose coupling 84 via a flexible detachable hose 85 leading to a motorized portable industrial dust collector of a known vacuum-cleaner type. Complex and costly ductwork is not required, and virtually all of the generated dust can be removed at it is created, while at the same time the shroud further provides excellent physical protection of the operator's hand from the high speed roughing tool.

In FIGURE 4, the edge rollers 33 and 34, upper and lower feed rolls 25 and 11, and roughing tool 39 are shown in operative relationships with a fragment of an outsole 86 undergoing roughening. Both the feed rolls 11 and 25 act to clamp the outsole between them, and, turning to apply forces in the direction of arrow 87, act to propel the periphery of outsole 86 generally in the direction of arrow 88. Guide rollers 33 and 34 respond by turning counterclockwise, in the directions of arrows 89. Roughing tool 39 is rotated counterclockwise by its shaft, in the direction of arrow 90 as viewed from above, but does not engage the upper surface of outsole 86 along its full abrasive bottom surface. In part this is due to the fact that the flat-bottomed outsole is shallower inwardly of the margin 91 than it is outwardly nearer the margin, and, in part, because the axis of rotation of the roughing tool is tilted slightly from the vertical. Angles 92 in FIGURE 2 characterize the permissible range of tilt of the roughing tool axis from the vertical, these angles preferably being up to about 15 degrees, about the fore-and-aft axis 54a (FIGURE 1). In selecting the appropriate tilt angle for a particular roughing operation, the bolts 93 and 94 securing brackets 53 and 54 to casting section 7a are loosened and these brackets are then turned about the axis 54a, carrying the beam 49 and all of the rougher head elements around with it. As is shown in FIGURE 3, bracket 54 is provided with an arcuate slot 95 in which a pair of stop pins 96 are disposed to permit and at the same time limit the desired tilting movements. Because of the lateral tilt imparted to roughing tool 39, the grinding forces exerted upon outsole 86 in direction 97 (FIGURE 4) are greater than those in the opposite direction, 98, and the resultant forces on the outsole thus drive it toward both of the edge guide rollers while also propelling it in the desired feed direction 88. The outsole is thus stabilized in its travel and does not tend to disengage itself from the machine. By way of distinction, a vertical (untilted) orientation of the roughing tool is found to promote the boring of holes, rather than the desired surface scouring.

In FIGURE 5 the operative relationships between roughing tool 39, table 10, lower feed roll 11, and outsole 86 in a matrix 99 are illustrated. Outsole 86 is there considered to be of a non-uniform thickness, such as results from the presence of an integral heel portion, and the matrix 99 is of a compensating thickness which insures that the combined workpiece fed into the roughing machine is regular and of but substantially one thickness. The very upper surfaces of the outsoles which require roughing for proper bonding to footwear uppers are found in practice to be of distinctly different contours (i.e., bevels), in different styles, size and manufacturing origins. For this reason, a roughing tool having but one orientation and a work table having but one fixed position can prevent uniform and continuous roughing of the outsoles. However, the adjustable tilt of roughing tool 39 permits different contours to be roughened effectively, as does also the adjustable positioning of table 10 in the opposite sense (about the transverse axis 12—12) relative to the tool. The bracketing of lower feed wheel 11, and its drive via an accommodating flexible transmission, insures that the workpiece is always propelled surely and that it can at the same time assume the desired inclinations about the transverse axis.

Operation of the machine involves first the insertion of a flat outsole, or a heeled outsole and matrix combination, into the machine on table 10 in position such that a marginal edge of the outsole is in engagement with both guide rollers 33 and 34. The latter are at a fixed height in the machine framework, and their proper engagement with the outsole edge is assured by the permitted vertical adjustment of table 10 to bring the outsole, or a matrix-mounted outsole, to the appropriate corresponding level. Depending upon the contouring of the upper surfaces of the outsole, and depending upon the materials involved and depth and width of scouring or grinding which is to be performed, the table 10 is set at a suitable angle about its tilt axis 12—12 and the roughing tool axis is angularly adjusted to an appropriate tilted orientation about the fore-and-aft axis 55 both to assure the desired uniform and continuous roughing and to produce needed components of force urging the outsole toward the edge rollers. The exhaust shroud 80 is then swung into the operative position about the roughing tool, if it has not already been stationed there. When the operator actuates a foot switch at the base of the machine, a solenoid valve or the like energizes the pneumatic motor 31 to depress the upper feed roll 25 until it makes a firm mechanical contact with the upper surface of the outsole. Simultaneously, the roughing tool follows the downward movement of the upper feed roll yoke arms, because of the downwardly-directed spring biasing of its associated stop 61a against the stop plate 68. The rotating roughing tool soon engages the upper outsole surfaces and its spring biasing assembly 57 regulates the downward pressures of the tool on the outsole in accordance with the biasing forces set by the operator through manipulation of the side knob 67. As the sole is driven by the two feed rolls and roughing tool, the desired scouring or grinding 100 (FIGURES 3 and 4) is developed across the near-marginal areas which are to be cemented to the under side of a shoe upper, and the operator releases the foot switch when visually observing that the periphery of the outsole has made a full excursion through the machine. The latter action reverses the pressurization of the motor 31 and immediately results in elevation of the upper feed roll and the roughing tool taking them out of operative engagement with the outsole. The operator then removes the outsole, or outsole-matrix combination, from the table 10 and inserts another for a subsequent cycling.

While specific practices have been described, and while preferred embodiments have been illustrated and referred to in the descriptions, it should be understood that various changes, modifications, additions and substitutions may be effected without departure from these teachings, and it is aimed in the appended claims to embrace all such variations as fall within the true spirit and scope of this invention.

What we claim as new and desire to secure by Letters Patent in the United States is:

1. In a shoe machine for treating the surfaces of an outsole which are to be bonded to an upper, the combination of a support, a substantially planar table carried by said support at the front thereof for supporting an outsole workpiece thereon, edge guide means mounted on said support for engagement with edges of a workpiece rearwardly of said table, a rotatable upper feed roll mounted for substantially horizontal rotation on said support in position for substantially vertical movements into and out of frictional driving engagement with upper surfaces of a workpiece on said table, first motive means mounted on said support for rotating said feed roll, and a roughing head assembly pivotally mounted on said support for selectable angular orientations about a fore-and-aft axis of said machine, said roughing head assembly including a roughing tool, means mounting said roughing tool for rotation above said table about an axis in a substantially vertical plane which is substantially perpendicular to said fore-and-aft axis, second motive means mounted in said pivotally-mounted roughing head assembly for rotation of said roughing tool, stop means limiting pivotal movements of said roughing head assembly to a relatively small angular range within which the axis of rotation of said roughing tool is near the vertical, and means for locking said roughing head assembly to said support at selected angular orientations within said range about said fore-and-aft axis.

2. In a shoe machine for treating the surfaces of an outsole which are to be bonded to an upper, the combination of a support, a substantially planar table carried by said support near the front thereof, edge guide means mounted on said support for engagement with edges of a workpiece supported by said table, a feed roll mounted on said support for rotation about a substantially horizontal axis and for engagement with upper surfaces of a workpiece on said table, a first electric motor mounted on said support for rotating said feed roll, and a roughing head assembly pivotally mounted on said support for selectable angular orientations about a fore-and-aft axis of said machine, said roughing head assembly including a roughing tool, means mounting said roughing tool for rotation above said table about an axis in a substantially vertical plane which is substantially perpendicular to said fore-and-aft axis, a second electric motor mounted on said pivotally-mounted roughing head assembly for rotation of said roughing tool, means limiting pivotal movements of said roughing head assembly to a relatively small angular range within which the axis of rotation of said roughing tool is near the vertical, and means for locking said roughing head assembly to said support at selected angular orientations within said range about said fore-and-aft axis.

3. In a shoe machine for treating the surfaces of outsoles as set forth in claim 2, the combination wherein said fore-and-aft axis is disposed near the center of said roughing tool, and wherein said small angular range extends about 15 degrees in at least one angular direction from the vertical.

4. In a shoe machine for treating the surfaces of outsoles as set forth in claim 2, the combination wherein said roughing head assembly further includes means for selectably positioning said mounting means for said roughing tool laterally in substantially horizontal directions relative to said fore-and-aft axis, and means for locking said mounting means for said roughing tool in the selected lateral positions, whereby said roughing tool may be oriented laterally in relation to said feed roll and edge guide means to regulate the propulsion forces on the workpiece and to control the areas of roughening of the workpiece.

5. In a shoe machine for roughening the surfaces of an outsole which are to be bonded to an upper, the combination of a support, a substantially planar table carried by said support near the front thereof, edge guide means mounted on said support for engagement with edges of a workpiece supported by said table, a feed roll mounted on said support for rotation about a substantially horizontal axis and for engagement with upper surfaces of a workpiece on said table, a first electric motor mounted on said support for rotating said feed roll, and a tiltable roughing head assembly mounted on said support, said roughing head assembly including a roughing tool, means disposed nearer the front of the machine for mounting said roughing tool for rotation above said table about an axis, and a second electric motor disposed nearer the rear of the machine with the axis of rotation thereof substantially parallel to said roughing tool axis, intermediate mounting means mechanically supporting both said second electric motor and said means for mounting said roughing tool in counterbalancing relationship, belt and pulley means coupling said roughing tool with said second electric motor for rotation thereby, means mounting said intermediate mounting means on said support for selectable pivotal orientations about a fore-and-aft axis of said machine within a small angular range within which said roughing tool axis is near the vertical, and means for sliding said intermediate mounting means in the fore-and-aft directions to adjust the fore-and-aft positions of said roughing tool without disturbing said coupling by said belt and pulley means, and means for locking said intermediate means to said support to lock said roughing head assembly in selected angular and fore-and-aft orientations.

6. In a shoe machine for roughening the surfaces of an outsole as set forth in claim 5, the combination wherein said means mounting said roughing tool is slidably affixed to said intermediate mounting means for selectable lateral orientations of said roughing tool axis in relation to said fore-and-aft axis while preserving said roughing tool axis substantially parallel to the axis of rotation of said second electric motor, means for locking said means mounting said roughing tool in relation to said intermediate mounting means, means mounting said second electric motor on said intermediate mounting means slidably in the fore-and-aft direction of the machine, and means for locking said means mounting said second electric motor in relation to said intermediate mounting means.

7. In a shoe machine for roughening the surfaces of an outsole as set forth in claim 5, the combination wherein said intermediate means comprises a substantially cylindrical beam member extending in the fore-and-aft direction of the machine, and bracket means supporting said beam member on said support for pivotal movements about and parallel with said fore-and-aft axis.

8. In a shoe machine for treating the surfaces of outsoles for bonding with uppers, the combination of a support, a work-supporting table at the front of said support, edge guide means mounted for engagement with edges of an outsole workpiece supported by said table, mounting bracket means carrying said table, a lower feed roll carried on said support for rotation about an axis extending in the fore-and-aft direction of the machine and projecting slightly above the upper surface of said table for engagement with an outsole workpiece thereon, means pivotally mounting said bracket means on said support for adjustable angular orientations about a substantially horizontal axis transverse to said fore-and-aft direction within a small angular range which includes the orientations at which said table is horizontal, an upper feed roll carried on said support for rotation about a substantially horizontal fore-and-aft axis and for engagement with upper surfaces of a workpiece on said table, means mounted on said support for rotating said feed rolls, and a roughing head assembly mounted on said support, said roughing head assembly including a rotatable roughing tool engageable with upper surfaces of a workpiece on said table, means for pivoting said roughing tool to selected angular orientations about a fore-and-aft axis of said machine within a small angular range near the vertical orientation, and means for locking said roughing tool at said selected angular orientations.

9. In a shoe machine for treating the surfaces of outsoles for bonding with uppers, the combination of a support, a substantially planar work table at the front of said support, edge guide means mounted for engagement with edges of an outsole workpiece supported by said table, mounting bracket means carrying said table, a lower feed roll journalled in said mounting bracket means for rotation about an axis extending in the fore-and-aft direction of the machine and projecting above the upper surface of said table for engagement with an outsole workpiece thereon, means pivotally mounting said bracket means on said support for adjustable angular orientations about an axis transverse to said fore-and-aft direction within a small angular range which includes the orientation at which said table is horizontal, an upper feed roll mounted on said support for rotation about a substantially horizontal fore-and-aft axis and for engagement with upper surfaces of a workpiece on said table, means mounted on said support for rotating said feed rolls, said rotating means including universal couplings accommodating movements of the axes of rotation of said feed rolls, and a roughing head assembly mounted on said support, said roughing head assembly including a rotatable roughing tool engageable with upper surfaces of a workpiece on said table, means for pivoting said roughing tool to selected angular orientations about a fore-and-aft axis of said machine within a small angular range near the vertical orientation, and means for locking said roughing tool at said selected angular orientations.

10. In a shoe machine for roughing the surfaces of outsoles for bonding with uppers, the combination of a support, a substantially planar work table at the front of said support, edge guide means mounted on said support at a fixed height for engagement with edges of an outsole workpiece supported by said table, first mounting bracket means carrying said table, a lower feed roll, said bracket means including journals supporting said feed roll for rotation about an axis extending in the fore-and-aft direction of the machine, said feed roll projecting slightly above the upper surface of said table for engagement with an outsole workpiece thereon, second mounting bracket means mounted on said support for adjustable heightwise orientations relative to said edge guide means and pivotally mounting said first bracket means for adjusting angular orientations about a horizontal axis which is transverse to said fore-and-aft direction within a small angular range which includes the orientation at which said table is horizontal, an upper feed roll mounted on said support for rotation about a substantially horizontal fore-and-aft axis and for engagement with upper surfaces of a workpiece on said table, means mounted on said support for rotating said feed rolls, said rotating means including universal couplings accommodating movements of the axes of said feed rolls, and a roughing head assembly including a rotatable roughing tool engageable with upper surfaces of a workpiece on said table, means for pivoting said roughing tool to selected angular orientations about a fore-and-aft axis of said machine within a small angular range near the vertical orientation, and means for locking said roughing tool at said selected angular orientations.

11. In a shoe machine for treating the surfaces of an outsole which are to be bonded to an upper, the combination of a support, a work-supporting table carried by said support at the front thereof, edge guide means mounted on said support for engagement with edges of a workpiece rearwardly of said table, a rotatable upper feed roll, means mounting said upper feed roll for substantially horizontal rotation on said support and for substantially vertical movements into and out of frictional driving engagement with upper surfaces of a workpiece on said table, first motive means mounted on said support for rotating said feed roll, and a roughing head assembly pivotally mounted on said support for selectable angular orientations about a fore-and-aft axis of said machine, said roughing head assembly including a roughing tool, means mounting said roughing tool for rotation above said table about an axis in a substantially vertical plane which is substantially perpendicular to said fore-and-aft axis, said means mounting said roughing tool including means supporting said tool for longitudinal movements along the axis of rotation thereof, means resiliently urging said tool longitudinally and downwardly toward said table, second motive means mounted in said pivotally-mounted roughing head assembly for rotation of said roughing tool, stop means limiting pivotal movements of said roughing head assembly to a relatively small angular range within which the axis of rotation of said roughing tool is near the vertical, and means for locking said roughing head assembly to said support at selected angular orientations within said range about said fore-and-aft axis.

12. In a shoe machine for treating the surfaces of an outsole as set forth in claim 11, the combination wherein said means resiliently urging said roughing tool includes a spring exerting forces between said tool and said means mounting said tool, and means for selectably compressing said spring to different extents to exert different forces between said tool and means mounting said tool, whereby the pressures of said roughing tool on the upper surfaces of an outsole workpiece are selectably adjustable.

13. In a shoe machine for treating the surface of an outsole as set forth in claim 11, the combination wherein said second motive means comprises an electric motor mounted fixedly in said pivotally-mounted roughing head assembly with the axis of rotation thereof substantially parallel with said axis of rotation of said roughing tool, and further comprising means coupling said electric motor in driving relationship to said roughing tool, said coupling means including a longitudinally-extendable angular coupling accommodating said longitudinal movements of said roughing tool.

14. In a shoe machine for treating the surfaces of an outsole as set forth in claim 13, the combination wherein said electric motor is mounted at the rear of said roughing head assembly, and wherein said coupling means includes a pulley mounted in bearings in said means mounting said roughing tool, and belt and pulley means coupling said pulley with said electric motor, and wherein said longitudinally-extendable angular coupling connects said longitudinally-movable roughing tool with said pulley.

15. In a shoe machine for treating the surfaces of an outsole as set forth in claim 11, the combination further comprising third motive means actuatable to depress and elevate said means mounting said upper feed roll, whereby to move said upper feed roll into and out of engagement with upper surfaces of a workpiece on said table, and a pair of stop members fixed heightwise in relation to said third motive means and said roughing tool, respectively, and disposed for engagement upon elevation of said means mounting said upper feed roll, whereby said third motive means is effective to elevate said longitudinally-movable roughing tool and to disengage it from surfaces of an outsole workpiece on said table when actuated to elevate said upper feed roll.

16. In a shoe machine for treating the surfaces of an outsole as set forth in claim 15, the combination further comprises a hollow exhaust shroud shaped to fit closely about said roughing tool and having inlet openings near the site of said roughing tool, and means mounting said exhaust shroud for heightwise movements with said longitudinally-movable roughing tool, said exhaust shroud having an outlet for connecting said shroud with an evacuating device, whereby air drawn into said inlet openings near said tool entrains and exhausts roughing debris.

17. In a shoe machine for treating the surfaces of an outsole as set forth in claim 16, the combination wherein said means mounting said exhaust shroud includes means for pivoting said shroud about a pivot axis substantially parallel to and laterally displaced from the axis of said roughing tool, and wherein said exhaust shroud is opened along and inwardly of one side thereof to admit said roughing tool therein when pivoted into close fitting relationship therewith about said pivot axis.

18. In a shoe machine for treating the surfaces of an outsole which are to be bonded to an upper, the combination of a support, a work table carried by said support, edge guide means mounted for engagement with edges of an outsole workpiece, supported by said table, a feed roll mounted on said support for rotation about a substantially horizontal axis for engagement with upper surfaces of a workpiece on said table, means mounted on said support for rotating said feed roll, a roughing head assembly including a rotatable roughing tool engageable with upper surfaces of a workpiece on said table, a hollow exhaust shroud shaped to fit closely about said roughing tool and having inlet openings at the site of said roughing tool, and means pivotally mounting said exhaust shroud about a substantially vertical pivot axis displaced laterally from said roughing tool, said exhaust shroud having an outlet for connecting said shroud with an air-evacuating device, whereby air drawn into said shroud entrains debris created by roughing of workpiece surfaces by said roughing tool, and whereby said shroud may be pivoted about said axis out of close-fitting relationship with said roughing tool to permit access to said roughing tool.

References Cited in the file of this patent
UNITED STATES PATENTS
2,094,120   Fossa _____ Sept. 28, 1937